US010570662B2

(12) United States Patent
Miroshnichenko (10) Patent No.: US 10,570,662 B2
(45) Date of Patent: Feb. 25, 2020

(54) WHEEL CARRIAGE ASSEMBLY FOR GUIDED ASYMMETRIC FABRIC DEPLOYMENT

(71) Applicant: MECHOSHADE SYSTEMS, INC., Long Island City, NY (US)

(72) Inventor: Eugene Miroshnichenko, Oceanside, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 210 days.

(21) Appl. No.: 15/600,359

(22) Filed: May 19, 2017

(65) Prior Publication Data

US 2018/0334852 A1   Nov. 22, 2018

(51) Int. Cl.
| | |
|---|---|
| *E06B 9/58* | (2006.01) |
| *E04F 10/02* | (2006.01) |
| *E06B 9/24* | (2006.01) |
| *B60J 1/20* | (2006.01) |
| *A47H 1/06* | (2006.01) |
| *E04F 10/06* | (2006.01) |

(52) U.S. Cl.
CPC .............. *E06B 9/581* (2013.01); *B60J 1/2025* (2013.01); *E04F 10/02* (2013.01); *E06B 9/24* (2013.01); *A47H 1/06* (2013.01); *E04F 10/0607* (2013.01); *E06B 2009/2482* (2013.01); *E06B 2009/2494* (2013.01)

(58) Field of Classification Search
CPC ..... E06B 9/42; E06B 9/56; E06B 9/58; E06B 9/581; E06B 9/66; E06B 9/17046; E06B 2009/2482; E06B 2009/2494; B60J 1/2025; B60J 1/2055

USPC ......................................................... 16/97, 98
See application file for complete search history.

(56) References Cited

U.S. PATENT DOCUMENTS

| | | | | | |
|---|---|---|---|---|---|
| 643,629 | A | * | 2/1900 | Burrowes | B60J 1/2055 160/274 |
| 928,865 | A | * | 7/1909 | Hoyt | B60J 1/2025 160/280 |
| 1,446,747 | A | * | 2/1923 | Hoyt | E06B 9/58 160/282 |
| 3,469,892 | A | * | 9/1969 | Hall | F16C 13/006 16/97 |
| 3,708,916 | A | * | 1/1973 | Karp, Jr. | E05D 15/0613 49/409 |
| 3,843,995 | A | * | 10/1974 | Merrill | B60B 33/00 16/97 |
| 3,879,799 | A | * | 4/1975 | Williams | E05D 15/0613 104/94 |
| 4,141,106 | A | * | 2/1979 | Dixon | E05D 15/0613 16/89 |

(Continued)

*Primary Examiner* — Colleen M Chavchavadze
(74) *Attorney, Agent, or Firm* — Snell & Wilmer L.L.P.

(57) ABSTRACT

Wheel carriage assemblies and related fabric deployment systems and methods are disclosed. A wheel carriage assembly comprising at least one wheel with ball bearings on the interior of each wheel, and a pivot point that allows for position independence, is configured with a hembar coupled to a piece of fabric to allow a surface of varying shape to be covered. The system provides the ability to cover both traditional window shapes as well as surfaces of irregular shape or inclined orientation, and reduces and evens the amount of wear on certain components to extend system life.

18 Claims, 8 Drawing Sheets

(56) References Cited

U.S. PATENT DOCUMENTS

| | | | | |
|---|---|---|---|---|
| 4,204,719 A * | 5/1980 | Murphy | A61H 3/008 | 104/62 |
| 4,229,857 A * | 10/1980 | Toder | A47H 15/02 | 104/89 |
| 4,302,865 A * | 12/1981 | Dixon | E05D 15/0613 | 16/102 |
| 4,306,756 A * | 12/1981 | Whiting | F16C 13/006 | 16/107 |
| 4,457,046 A * | 7/1984 | Vater | E05D 15/063 | 105/155 |
| 4,752,987 A * | 6/1988 | Dreyer | E05D 15/0613 | 104/94 |
| 4,798,149 A * | 1/1989 | Hoffmann | B61B 10/022 | 104/94 |
| 5,063,636 A * | 11/1991 | Dickson | E05D 15/0613 | 16/106 |
| 5,181,296 A * | 1/1993 | Williams | E05D 15/0613 | 104/94 |
| 5,406,676 A * | 4/1995 | Williams | E05D 15/0613 | 16/87 R |
| 5,560,668 A * | 10/1996 | Li | B60J 1/2044 | 160/265 |
| 5,839,493 A * | 11/1998 | Quasius | E06B 9/165 | 160/133 |
| 6,035,918 A * | 3/2000 | Kraeutler | E06B 9/13 | 160/267.1 |
| 6,581,242 B2 * | 6/2003 | Owens | E04B 2/827 | 16/107 |
| 6,912,812 B2 * | 7/2005 | Inage | E05D 15/063 | 16/87 R |
| 6,983,786 B2 * | 1/2006 | Chen | B60J 1/2025 | 160/370.22 |
| 7,252,321 B2 * | 8/2007 | Lee | B60J 1/2025 | 160/370.22 |
| 7,314,079 B2 * | 1/2008 | Yano | B60J 1/2027 | 160/265 |
| 7,934,533 B2 * | 5/2011 | Walter | B60J 1/2027 | 160/370.22 |
| 8,146,980 B2 * | 4/2012 | Takeuchi | B60J 1/2025 | 160/370.22 |
| 8,474,097 B2 * | 7/2013 | Andren | E05D 15/063 | 16/98 |
| 8,540,008 B2 * | 9/2013 | Chen | B60J 1/2025 | 160/274 |
| 8,857,015 B2 * | 10/2014 | Hufen | E05D 15/063 | 16/91 |
| 8,960,261 B1 * | 2/2015 | Williams | B60J 1/2025 | 160/370.22 |
| 9,556,672 B2 * | 1/2017 | Pfaff | E06B 9/13 | |
| 2015/0007948 A1 * | 1/2015 | Voges | E06B 9/68 | 160/310 |
| 2017/0009524 A1 * | 1/2017 | Dwarka | E06B 9/24 | |

* cited by examiner

SECTION A-A
FIG. 3

SECTION B-B

Section C-C

FIG. 5B

WHEEL CARRIAGE ASSEMBLY FOR GUIDED ASYMMETRIC FABRIC DEPLOYMENT

TECHNICAL FIELD

The disclosure generally relates to fabric deployment systems, and more particularly, to flexible wheel carriage assemblies suitable for guiding hembars.

BACKGROUND

Wheel carriage assemblies are typically used to facilitate movement of (and/or guide in three-dimensional space) items such as pieces of fabric or other flexible material, panels, louvers, doors, and so forth. For example, a wheel carriage assembly may be utilized to move pieces of fabric along a guide track to cover a specific area. In a window roller shade application, a wheel carriage assembly often couples to a hembar which may be coupled to a piece of fabric. In response to the hembar moving in a direction, the wheel carriage assembly moves as well, allowing the fabric to move and cover the desired area. However, the area that is desired to be covered may not be of a uniform shape, and may be positioned at an angle or different angles with respect to horizontal and vertical planes in a particular three-dimensional space. For example, a covering may be utilized for a triangular window or a semi-circular window over a doorway, or a window that is a truncated triangle and is both sloping and tilted (i.e., where the top and bottom are not in the same plane, and the sidewalls are not in parallel).

In prior approaches, when a window shade having a hembar coupled to a wheel carriage assembly at either end is pulled, the hembar at the end of the fabric may not move freely, its position dependent on the position, sliding resistance, etc. of the various wheel carriage assemblies attached to the hembar. Additionally, the maneuvering of the hembar may place a large weight load on specific wheels contained within the wheel carriage assembly (for example, wheels closest to a hembar coupling point). This imbalance of the load can cause particular wheels in the wheel carriage assembly to wear at faster rate than their counterparts.

Additionally, in various prior approaches, wheel connecting devices used to connect the wheels to the rest of the wheel carriage assembly may be inserted through the center of the wheel. Without more, the wheel connecting devices continually experience sliding friction and/or binding while the wheel carriage assembly is pulled along the guide track. This type of friction is hard on the wheel carriage assembly, along the wheel connecting devices in particular, and can cause a high degree of wear as well, especially in applications where the guide track is not parallel to the direction of movement of the hembar and fabric. Accordingly, improved systems and methods for facilitating movement of a hembar are desirable.

SUMMARY

In an exemplary embodiment, a fabric deployment system comprises a guide track, a hembar coupled to a fabric, the hembar having an end, and a wheel carriage assembly. The wheel carriage assembly comprises a wheel and a pivot point. The wheel contains ball bearings, the pivot point removably couples to the end of the hembar, and the hembar is configured to move about the pivot point.

In another exemplary embodiment, a method of covering a surface comprises coupling a piece of fabric to a wheel carriage assembly via a hembar; and pulling the piece of fabric in a direction of desired coverage. The hembar has an end, the piece of fabric travels along a guide track, a wheel carriage assembly comprising a wheel and a pivot point freely moves within the guide track, the wheel contains ball bearings, the pivot point removably couples to the end of the hembar, and the hembar is configured to move about the pivot point.

In another exemplary embodiment, a wheel carriage assembly for use in connection with a guide track comprises four wheels coupled to a wheel connecting device; and a pivot point for pivotably coupling the wheel connecting device to a hembar. Each of the four wheels contains ball bearings, the pivot point is located equidistant from the four wheels, and, responsive to movement of the wheel carriage assembly in the guide track, the four wheels remain in at least partial contact with the interior of the guide track, regardless of the orientation of the guide track in three-dimensional space.

The contents of this summary section are intended as a simplified introduction to the disclosure, and are not intended to be used to limit the scope of any claim.

BRIEF DESCRIPTION OF THE DRAWINGS

A more complete understanding of principles of the present disclosure may be derived by referring to the detailed description and claims when considered in connection with the Figures, wherein like reference numbers refer to similar elements throughout the Figures, and where:

It should be appreciated by one of ordinary skill in the art that, while principles of the present disclosure are described with reference to the figures described above, such principles may also include a variety of embodiments consistent with the description herein. It should also be understood that, where consistent with the description, there may be additional components not shown in the system diagrams, and that such components may be arranged or ordered in different ways.

DETAILED DESCRIPTION

The detailed description shows embodiments by way of illustration, including the best mode. While these embodiments are described in sufficient detail to enable those skilled in the art to practice the principles of the present disclosure, it should be understood that other embodiments may be realized and that logical and mechanical changes may be made without departing from the spirit and scope of principles of the present disclosure. Thus, the detailed description herein is presented for purposes of illustration only and not of limitation. For example, the steps recited in any of the method descriptions may be executed in any order and are not limited to the order presented.

Moreover, for the sake of brevity, certain sub-components of individual components and other aspects of the system may not be described in detail herein. It should be noted that many alternative or additional functional relationships or physical couplings may be present in a practical system. Such functional blocks may be realized by any number of components configured to perform specified functions.

The disclosure includes a system that allows for the hembar to be position independent so that it is able to freely move irrespective of the position of its opposite end, enabling surfaces of irregular shapes to be covered more easily. The system reduces the load on the wheels and additionally reduces the friction experienced by the wheel connecting devices. The reduction of load and friction decreases the overall wear and tear on the wheel carriage assembly, which in turn saves costs by reducing the number of parts that may need to be replaced.

In various embodiments, an exemplary fabric deployment system (e.g., a window shading system or the like) comprises one or more wheel carriage assemblies suitable for coupling to a hembar. The wheel carriage assemblies may be configured with wheels with ball bearings on the interior that maintain contact with a wheel connecting device. This configuration keeps the device in rotational friction with the wheel rather than sliding friction, and reduces the amount of wear on the wheels and the wheel connecting device. While the disclosure may be described in association with a window shading system, one skilled in the art will appreciate that similar components, systems, methods and advantages may be used with other systems that benefit from wheel carriage assemblies.

Further, an exemplary fabric deployment system is configured to reduce the load on certain wheels in the wheel carriage assembly. This configuration allows a choice of wheels to receive more wear than others by placing the hembar and pivot point closer or further from specific wheels. In various embodiments, the hembar and pivot point are located equidistant from each wheel. Such a location helps to spread the weight evenly (or similar) between all wheels present in the system, and causes the wheels to wear at a same (or similar) rate.

Figure 1A:
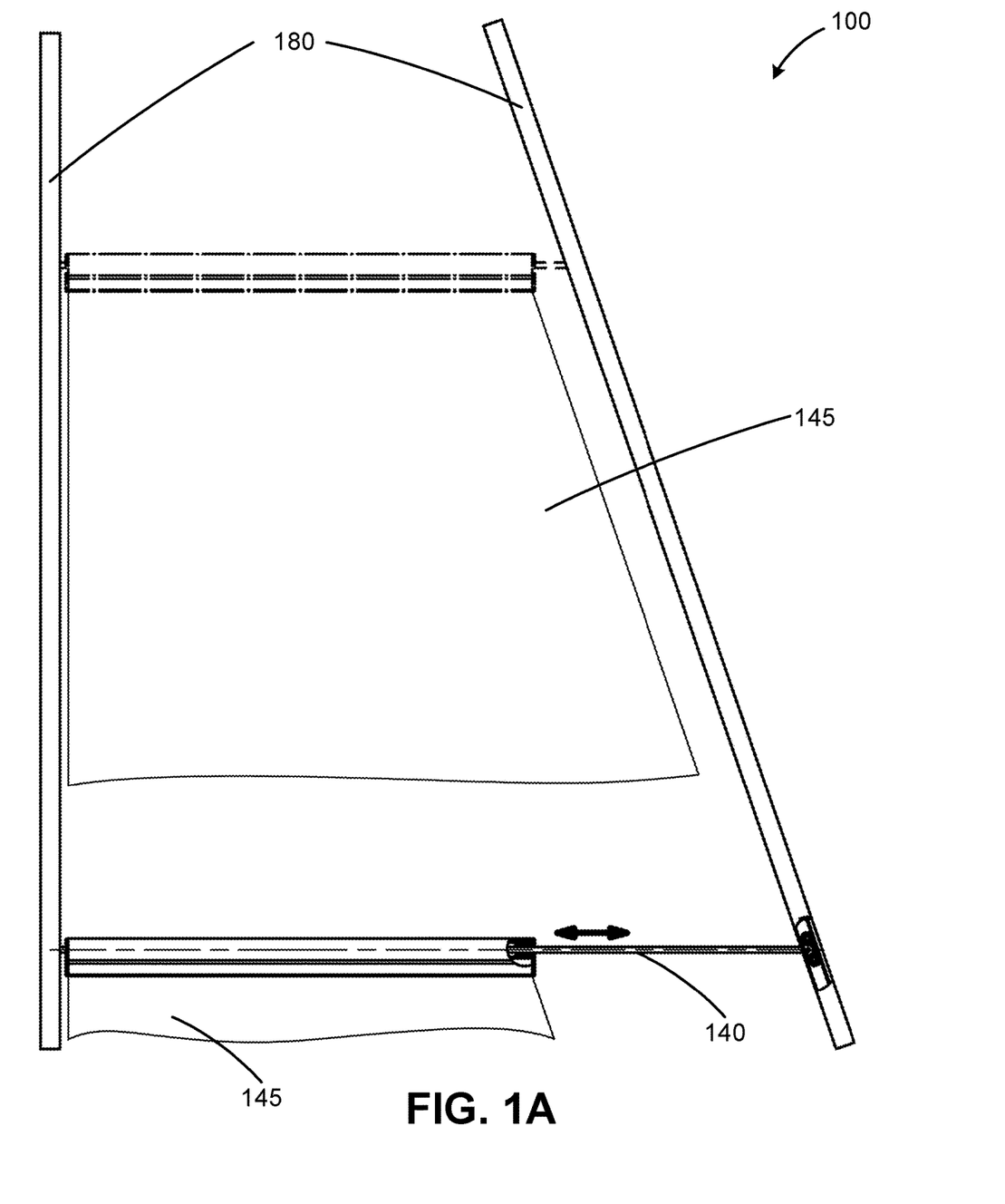
FIG. 1A illustrates an exemplary fabric deployment system, in accordance with various embodiments.
Figure 1B:
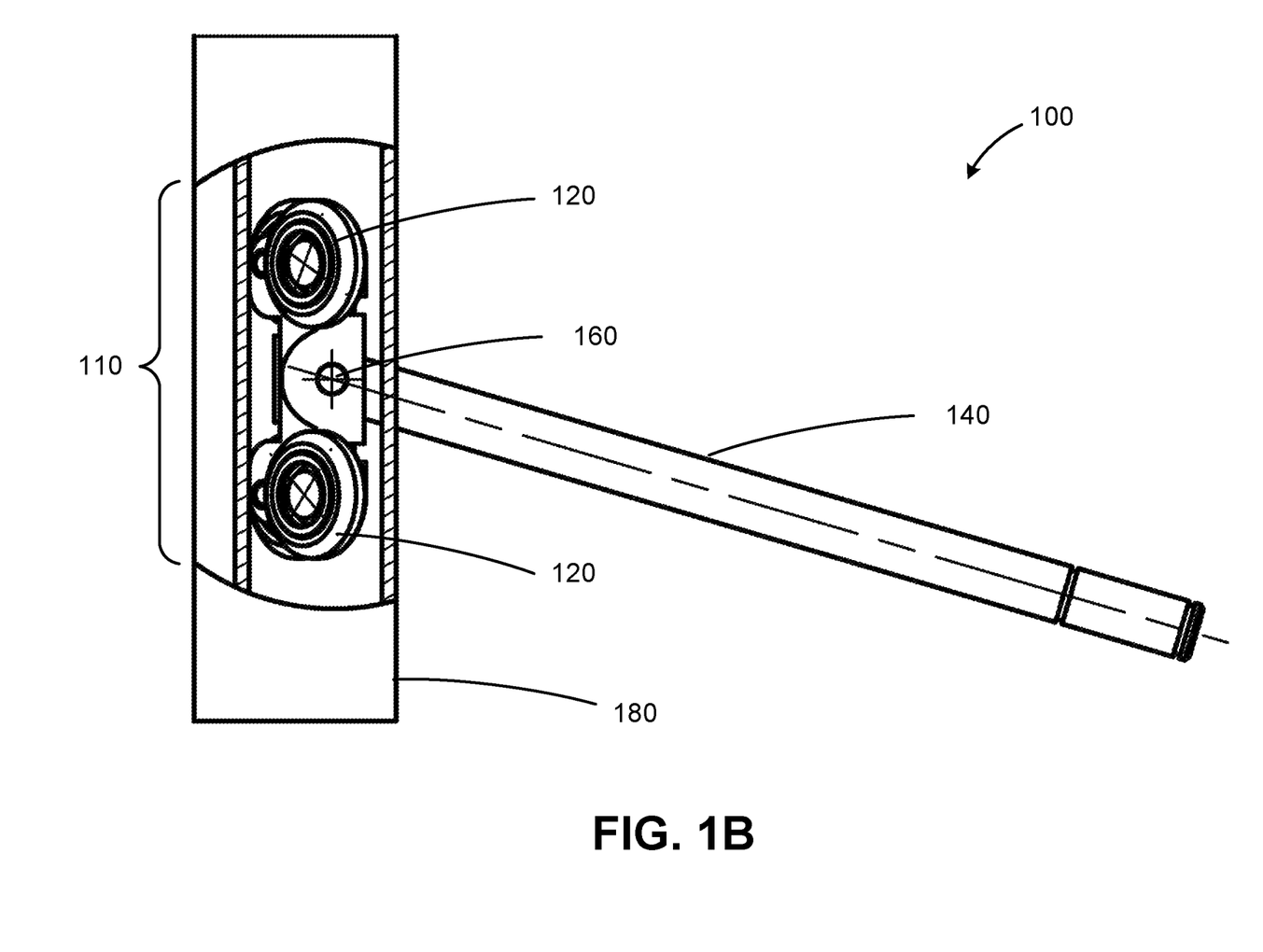
FIG. 1B illustrates an exemplary flexible wheel carriage assembly contained within a guide track, in accordance with various embodiments.

With reference now to FIGS. 1A and 1B, in various embodiments, a fabric deployment system 100 comprises at least one wheel carriage assembly 110 disposable at least partially within a guide track 180. The wheel carriage assembly 110 comprises at least one wheel 120, with various embodiments having multiple wheels 120. Wheel carriage assembly 110 is configured to couple to a hembar 140 at a pivot point 160. A guide track 180 is configured to at least partially contain wheel carriage assembly 110, thus directing a path along which the hembar 140 may travel. Guide track 180 is configured to at least partially receive the wheel carriage assembly 110 in order to facilitate movement of hembar 140 between various desired locations.

Figure 1C:
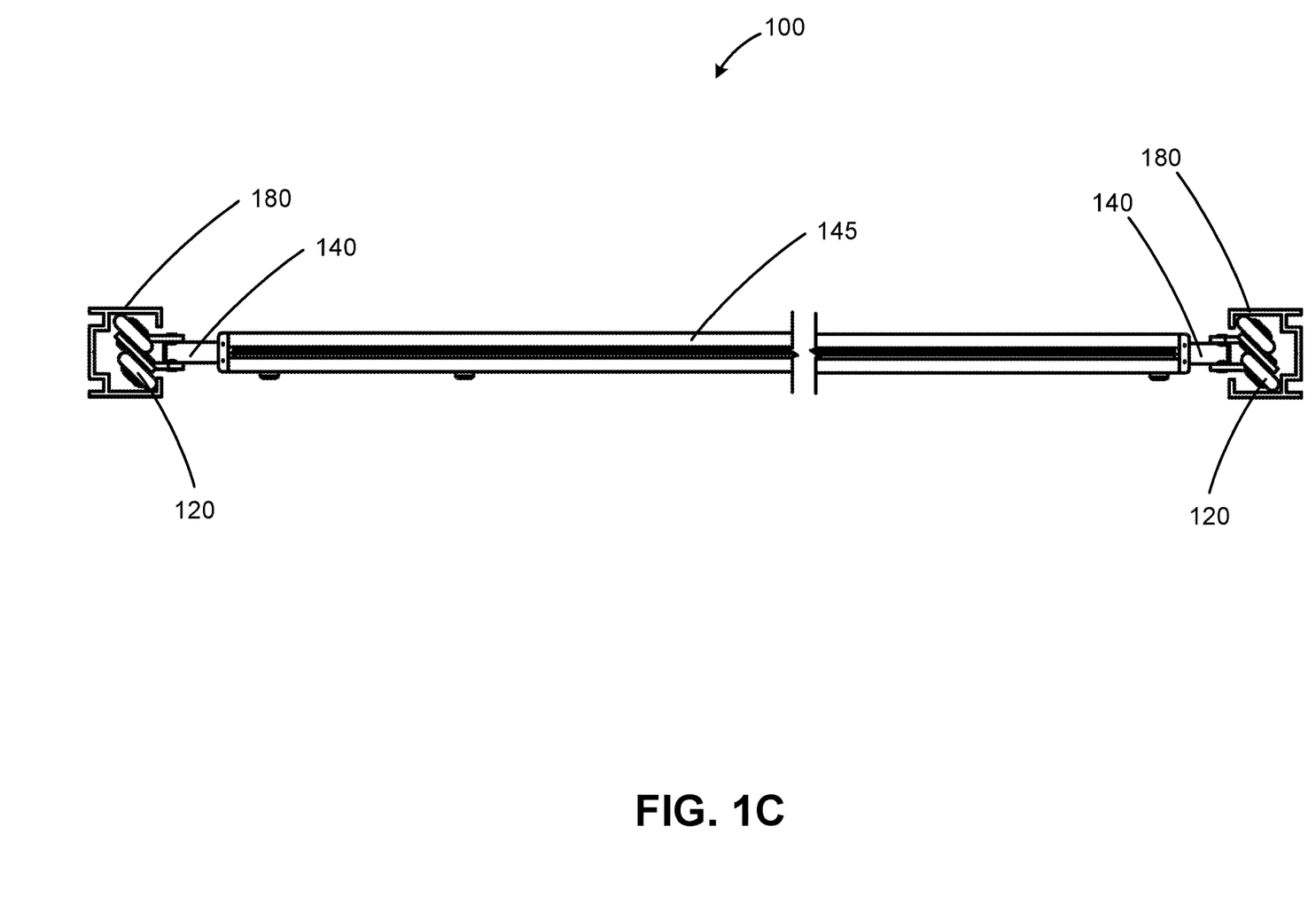
FIG. 1C illustrates an exemplary fabric deployment system utilizing a guide track, a hembar, and a wheel carriage assembly at either end of the hembar, in accordance with various embodiments.

With reference now to FIG. 1C, in various embodiments, a fabric deployment system 100 may utilize a pair of wheel carriage assemblies 110 to guide deployment and retraction of shade fabric with respect to an associated area. The hembar 140 may be coupled to the end of a length of fabric 145. Each end of the hembar 140 may be coupled to a wheel carriage assembly 110 that is housed within a guide track 180. The guide tracks 180 may travel any length and any direction for covering the desired surface. For example, guide tracks 180 may be disposed in a parallel manner (i.e., for a rectangular window). Moreover, guide tracks 180 may be disposed at an angle with respect to one another. For example, for use in connection with a telescoping hembar 140 to shade a window that is narrower at the top than the bottom (or vice versa) (for example, as illustrated in FIG. 1A). The hembar 140 may be expandable, allowing the opposing guide tracks 180 to traverse a path in a direction away from one another while still coupled to the same hembar 140. In various embodiments, the fabric 145 may have a fixed width or the width of the fabric 145 may vary. The combination of an expandable/telescoping hembar 140 and fabric 145 with a varying width allows for surfaces of varying shape to be covered by the fabric 145.

System 100 may be utilized for shading of vertical surfaces, horizontal surfaces, angled surfaces, and/or combinations thereof (i.e., surfaces having both horizontal and vertical angles other than 0 degrees or 90 degrees). Use of system 100 helps to facilitate wheels 120 remaining in (at least partial or full) contact with guide track 180, regardless of the orientation of system 100 in three-dimensional space, ensuring smooth deployment and retraction of an associated shade, regardless of orientation.

In various embodiments, a single fabric deployment system 100 may be utilized in connection with a single area or multiple fabric deployment systems 100 may be utilized in connection with a single area. For example, two fabric deployment systems 100 can be used, one in front of the other, such as to employ a black out shade in addition to a regular shade over a window area.

Figure 2:
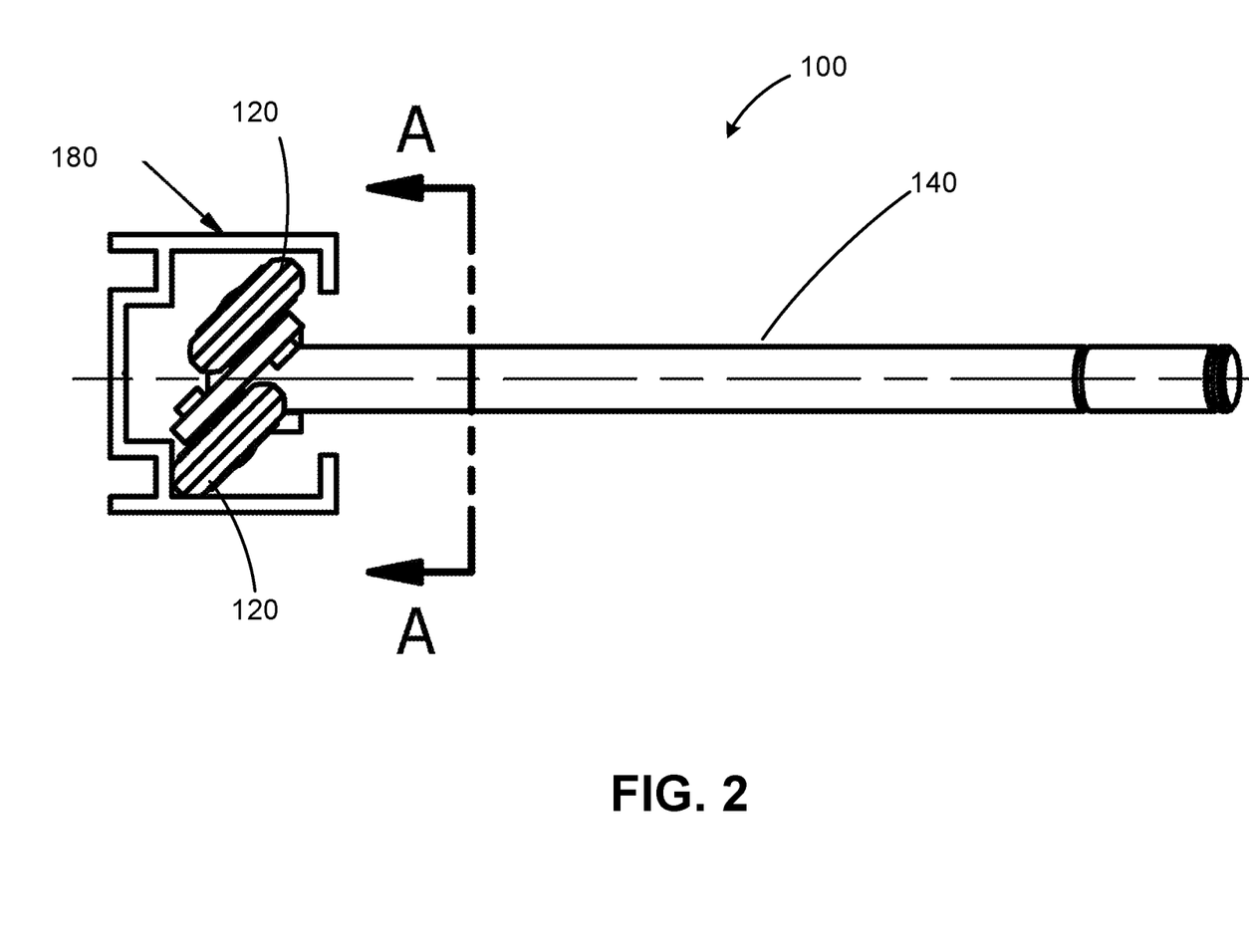
FIG. 2 illustrates components of an exemplary fabric deployment system utilizing a wheel carriage assembly, a hembar, and a guide track, in accordance with various embodiments.

With reference now to FIG. 2, in various embodiments, a view of a window shading system 100 is shown having multiple wheels 120, a hembar 140, and a guide track 180 having a generally rectangular interior space therein. In various embodiments, the wheels 120 are in physical contact with opposite interior corners of the guide track 180. Moreover, in various embodiments, the wheels 120 may be in physical contact with two or more sides of the guide track 180. Moreover, a wheel 120 may be in contact with two or more interior sides of guide track 180, for example portions of interior sides adjacent an interior corner of guide track 180. In various embodiments, one wheel 120 may be used that is kept in physical contact with a surface or surfaces inside of the guide track 180.

Figure 1D:
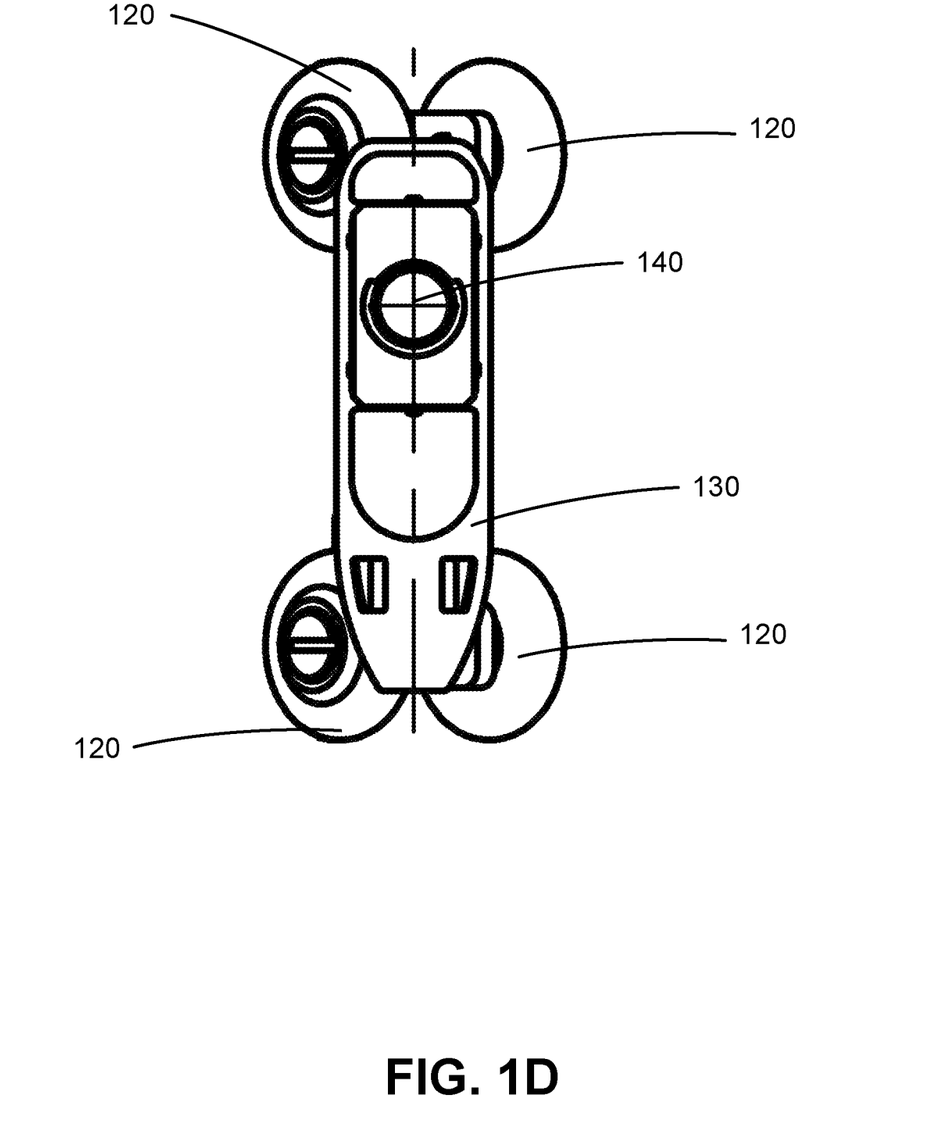
FIG. 1D illustrates a side view of the wheel carriage assembly of FIG. 1C, in accordance with various embodiments.
Figure 3:
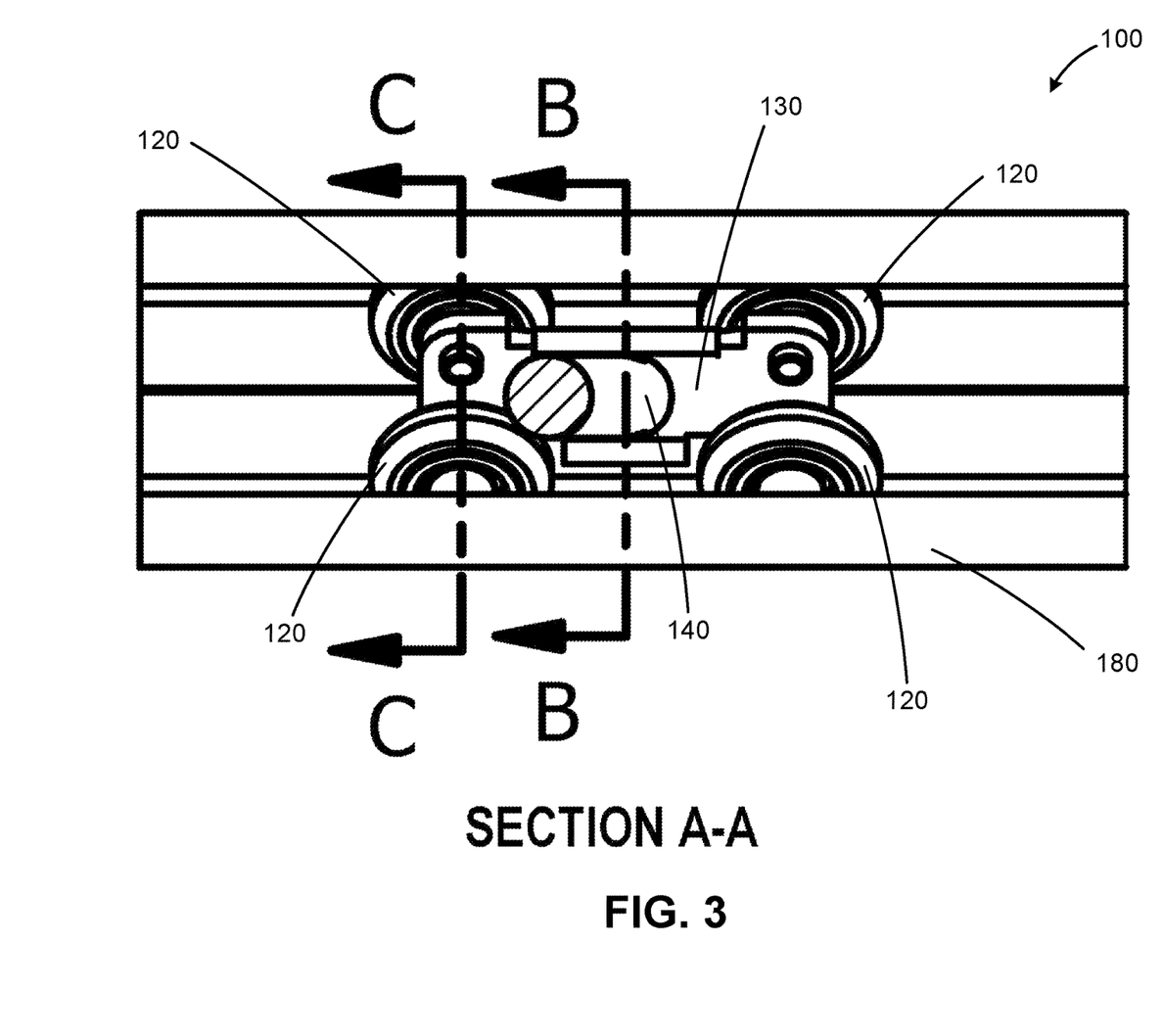
FIG. 3 illustrates a view, along section A-A from FIG. 2, of an exemplary guide track showing the wheel carriage assembly into which a hembar is inserted, in accordance with various embodiments.

Turning now to FIG. 3, depicting a view along section A-A shown in FIG. 2, in various embodiments, a window shading system 100 may be configured with multiple wheels 120 connected by a wheel connector 130. Wheel connector 130 may be configured to couple to a hembar 140 at a pivot point 160. In various embodiments, the hembar 140 may couple to the wheel connector 130 in a location generally equidistant from each wheel 120. Moreover, in various embodiments, with momentary reference to FIG. 1D, the hembar 140 may connect to the wheel connector 130 in a location closer to one or more wheels 120 than the remaining wheels 120. The wheel connector 130 may be in any shape or configuration that allows the wheels 120 to remain at a fixed distance from the other wheels 120. In certain embodiments, a wheel connector 130 may not be utilized.

Figure 4:
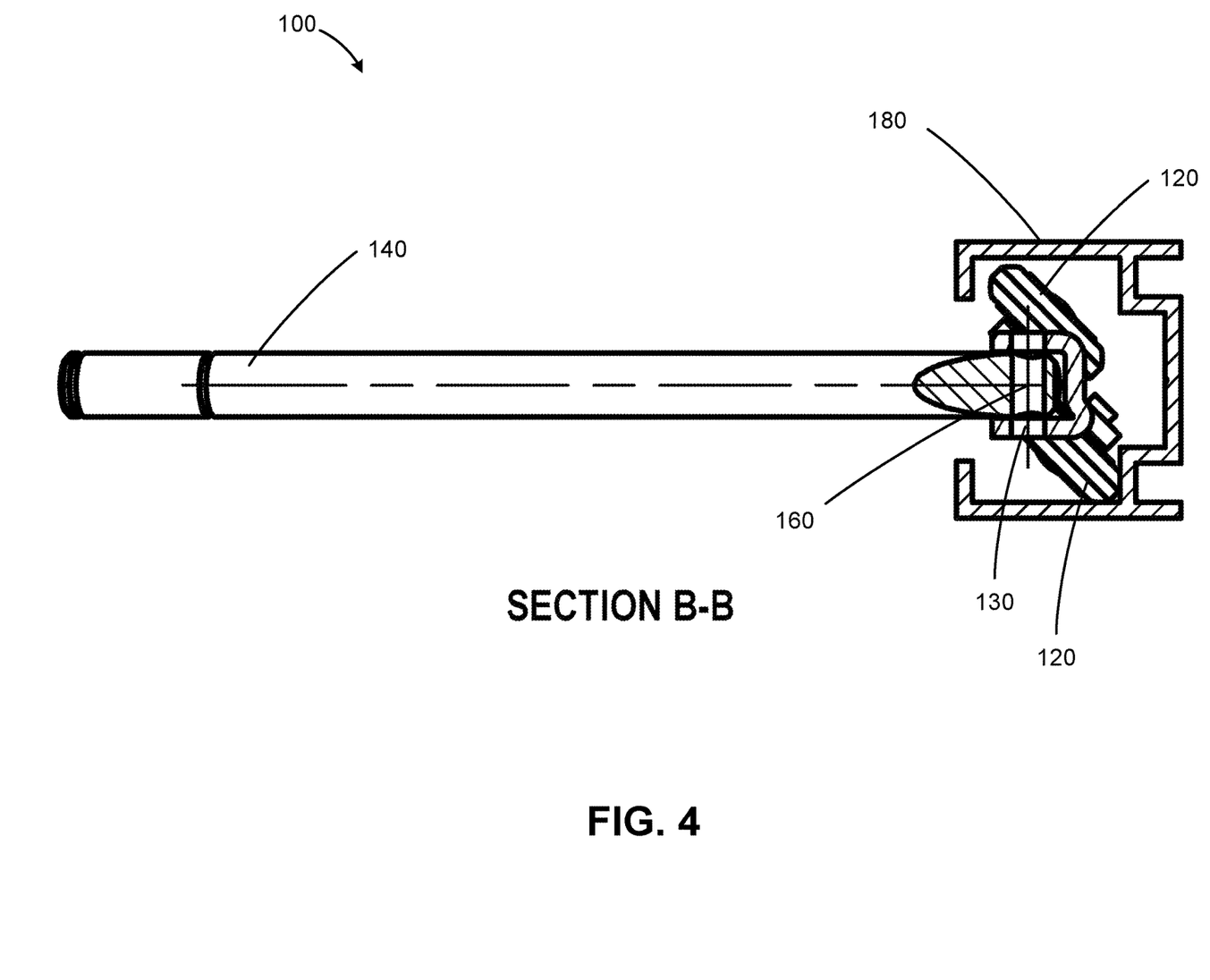
FIG. 4 illustrates a view, along section B-B from FIG. 3, of an exemplary guide track with a hembar coupled to a wheel carriage assembly at a pivot point, in accordance with various embodiments.

FIG. 4 depicts a view along section B-B shown in FIG. 3 of a window shading assembly 100. The hembar 140 may be coupled to a wheel connector 130 at a pivot point 160. In various embodiments, the pivot point 160 allows the hembar 140 to move at a range of angles, for example along a vertical axis when window shading assembly 100 is utilized in connection with a vertical window. In various embodiments, the pivot point 160 allows the hembar 140 to move at a range of angles along the horizontal axis, for example when window shading assembly 100 is utilized in connection with a skylight. In various embodiments, pivot point 160 allows hembar 140 a range of motion in a direction or number of directions.

Figure 5A:
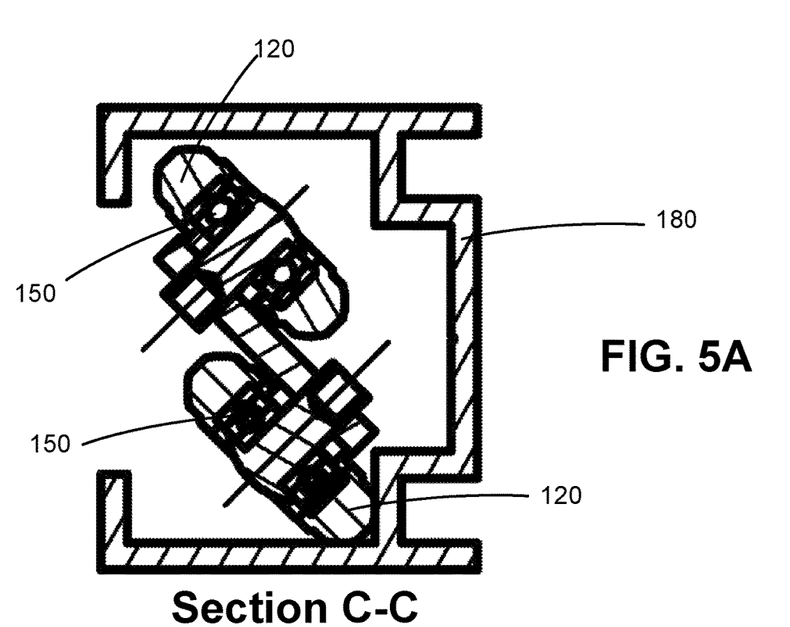
FIG. 5A illustrates a view, along section C-C from FIG. 3, of exemplary wheels that contain ball bearings in the interior contacting a guide track, in accordance with various embodiments.
Figure 5B:
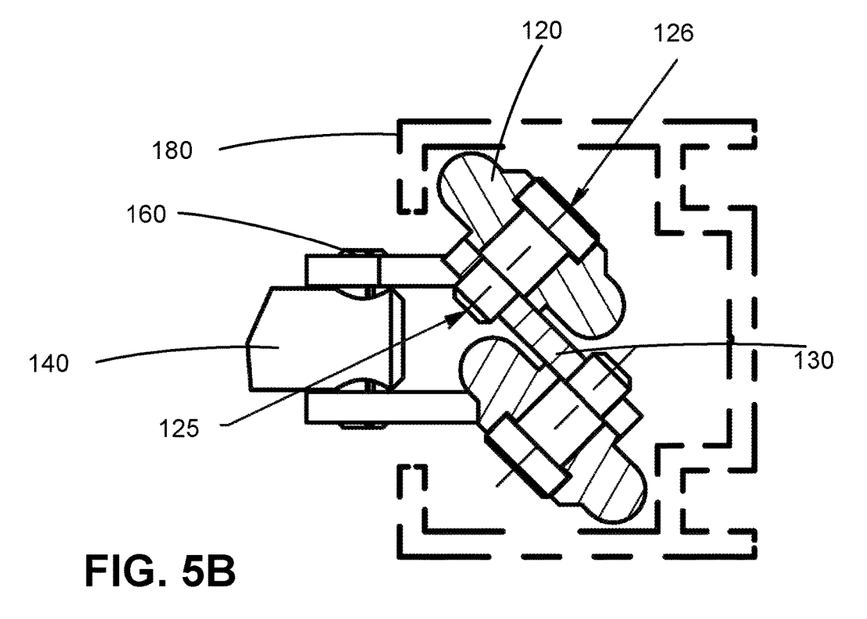
FIG. 5B illustrates a cross-section of portions of an exemplary fabric deployment system with wheel connecting devices coupling wheels to a wheel connector and a hembar coupled to the wheel carriage assembly at a pivot point, in accordance with various embodiments.

Turning now to FIG. 5A that depicts a view along section C-C from FIG. 3, in various embodiments, wheels 120 comprise ball bearings 150 in the interior of each wheel 120. With momentary reference to FIG. 5B, a wheel connecting device having ends at 125 and 126 maintains contact with the ball bearings 150 in FIG. 5A. The connection of the ball bearings 150 with the wheel connecting device allows the wheel connecting device to be subject to rotational friction instead of sliding friction, facilitating easier movement of window shading assembly 100.

Returning to FIG. 5B, in various embodiments, a wheel carriage assembly 100 comprises at least one wheel 120, a wheel connector 130, a hembar 140, and a pivot point 160. At least one wheel 120 may be coupled to a wheel connector 130 through use of a wheel connecting device that has a bottom end 125 and a top end 126. The wheel connecting device having ends 125, 126 may be a pin, a screw, a bolt, a dowel rod, or any other suitable connecting device. The pivot point 160 may be coupled to the wheel connector 130 in a manner that locates the pivot point outside of the guide track 180. The pivot point 160 may be located inside the guide track 180. In this manner, undesirable contact between hembar 140 and guide track 180 may be reduced.

While the steps outlined herein represent embodiments of principles of the present disclosure, practitioners will appreciate that there are a variety of physical structures and interrelated components that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Exemplary systems and methods are disclosed. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A fabric deployment system, comprising:
a hembar having a first portion, and a second portion,
wherein the first portion is coupled to a fabric, and
wherein the first portion receives the second portion such that the hembar is expandable by translating the second portion away from the first portion; and
a wheel carriage assembly having a first end and a second end, the wheel carriage assembly comprising:
a first wheel on the first end, wherein the first wheel has a first axis of rotation at a non-parallel angle and non-perpendicular angle with respect to the hembar; and
a second wheel on the first end, wherein the second wheel has a second axis of rotation at a non-parallel angle and a non-perpendicular angle with respect to the hembar, and
wherein the first axis of the rotation of the first wheel and the second axis of the rotation of the second wheel are offset from one another;
a pivot point directly coupling the wheel carriage assembly to the second portion of the hembar, and
wherein the hembar is configured to move about the pivot point to an angle with respect to a horizontal axis.

2. The fabric deployment system of claim 1, wherein the pivot point is configured to be located inside a guide track.

3. The fabric deployment system of claim 1, wherein the first wheel is configured to interface with a guide track while the second wheel is set away from interfacing the guide track.

4. The fabric deployment system of claim 1, wherein the pivot point is removably coupled to the hembar.

5. The fabric deployment system of claim 1, wherein the wheel carriage assembly further comprises a wheel connector, and wherein the hembar couples to the wheel connector at a place equidistant from the first wheel, the second wheel, a third wheel and a fourth wheel.

6. The fabric deployment system of claim 1, wherein:
the wheel carriage assembly is configured with the first wheel, the second wheel, a third wheel and a fourth wheel, and
responsive to the hembar moving the fabric, at least two of the first wheel, the second wheel, the third wheel or the fourth wheel of the wheel carriage assembly at least partially contact a guide track, without regard to an orientation of the guide track.

7. The fabric deployment system of claim 1, further comprising:
a third wheel on the second end, wherein the third wheel has a third axis of rotation at a non-parallel angle and non-perpendicular angle with respect to the hembar; and
a fourth wheel on the second end, wherein the fourth wheel has a fourth axis of rotation at a non-parallel angle and a non-perpendicular angle with respect to the hembar,
wherein the third axis of the rotation of the third wheel and the fourth axis of the rotation of the fourth wheel are offset from one another.

8. The fabric deployment system of claim 1, further comprising a guide track, wherein the guide track includes a first guide track and a second guide track, and wherein the first guide track is at an angle other than 0 degrees or 90 degrees with respect to the second guide track.

9. The fabric deployment system of claim 1, wherein the hembar moves in and out with respect to the wheel carriage assembly.

10. The fabric deployment system of claim 1, wherein the first wheel is configured to contact two sides of a guide track.

11. The fabric deployment system of claim 1, wherein the wheel carriage assembly comprises at least the first wheel and the second wheel, wherein the wheel carriage assembly further comprises a wheel connector, and wherein the hembar couples to the wheel connector at a location closer to the first wheel than the second wheel.

12. The fabric deployment system of claim 1, wherein the pivot point is configured to be located outside of a guide track.

13. The fabric deployment system of claim 1, wherein the hembar connects to the wheel carriage assembly closer to the first wheel than the second wheel.

14. The fabric deployment system of claim 1, wherein the first end of the hembar freely moves about the pivot point, irrespective of a position of the second end of the hembar.

15. The fabric deployment system of claim 1, further comprising a guide track, wherein the guide track includes a first guide track interfacing with the first end of the hembar and a second guide track interfacing with the second end of the hembar, and wherein the first guide track is not parallel to the second guide track.

16. The fabric deployment system of claim 1, wherein the first wheel further comprises ball bearings within an interior of the first wheel.

17. The fabric deployment system of claim 1, wherein the wheel carriage assembly maintains rotational friction with the first wheel, and reduces sliding friction with the first wheel.

18. The fabric deployment system of claim 1, wherein the first wheel and a second wheel are configured to interface with opposite interior corners of a guide track.

* * * * *